(12) United States Patent
Kamijo et al.

(10) Patent No.: US 10,189,105 B2
(45) Date of Patent: Jan. 29, 2019

(54) SHIELDING GAS FOR MAG WELDING, MAG WELDING METHOD, AND WELDED STRUCTURE

(75) Inventors: Yasuhito Kamijo, Yokohama (JP); Satoru Asai, Chigasaki (JP); Katsunori Wada, Kai (JP); Makoto Takahashi, Setagaya-ku (JP)

(73) Assignees: TOSHIBA ENERGY SYSTEMS & SOLUTIONS CORPORATION, Kawasaki-shi (JP); TAIYO NIPPON SANSO CORPORATION, Shinagawa-ku (JP)

( * ) Notice: Subject to any disclaimer, the term of this patent is extended or adjusted under 35 U.S.C. 154(b) by 2038 days.

(21) Appl. No.: 13/079,307

(22) Filed: Apr. 4, 2011

(65) Prior Publication Data

US 2011/0250472 A1    Oct. 13, 2011

(30) Foreign Application Priority Data

Apr. 9, 2010 (JP) ................................ 2010-090731

(51) Int. Cl.
  *B23K 9/02* (2006.01)
  *B23K 9/16* (2006.01)
  (Continued)

(52) U.S. Cl.
  CPC ............ *B23K 9/0213* (2013.01); *B23K 9/164* (2013.01); *B23K 9/173* (2013.01); *B23K 35/383* (2013.01); *B23K 2101/001* (2018.08); *B23K 2101/10* (2018.08); *B23K 2103/04* (2018.08); *B23K 2103/05* (2018.08); *Y10T 428/12979* (2015.01)

(58) Field of Classification Search
  CPC ..... B23K 9/2013; B23K 9/164; B23K 35/383

USPC ........ 219/117.1, 78.01, 85.18; 174/68, 71 C, 174/74 R, 75 R–75 C
See application file for complete search history.

(56) References Cited

U.S. PATENT DOCUMENTS 3,496,323 A * 2/1970 Lesnewich et al. ............ 219/74
4,572,942 A * 2/1986 Church .................... 219/137.42
(Continued)

FOREIGN PATENT DOCUMENTS

CN    101077547 A    11/2007
EP    1 123 773 A2    8/2001
(Continued)

OTHER PUBLICATIONS

Combined Chinese Office Action and Search Report dated Dec. 4, 2012, in Patent Application No. 201110090232.7 (with English-language translation).
(Continued)

*Primary Examiner* — Tu B Hoang
*Assistant Examiner* — Thomas Ward
(74) *Attorney, Agent, or Firm* — Oblon, McClelland, Maier & Neustadt, L.L.P.

(57) ABSTRACT

The shielding gas for MAG welding according to an embodiment is a shielding gas for MAG welding to perform narrow gap welding of a high Cr steel containing 8 wt % to 13 wt % of Cr with one layer-one pass by using a solid wire containing 8 wt % to 13 wt % of Cr, and the shielding gas for MAG welding comprises a ternary mixed gas of 5% by volume to 17% by volume of a carbon dioxide gas, 30% by volume to 80% by volume of a helium gas, and a balance of an argon gas.

9 Claims, 5 Drawing Sheets

(51) Int. Cl.
*B23K 9/173* (2006.01)
*B23K 35/38* (2006.01)
*B23K 101/00* (2006.01)
*B23K 101/10* (2006.01)
*B23K 103/04* (2006.01)

(56) References Cited

U.S. PATENT DOCUMENTS

| | | | | |
|---|---|---|---|---|
| 4,857,692 A | * | 8/1989 | Larson et al. | 219/74 |
| 6,303,904 B1 | | 10/2001 | Iwatsubo et al. | |
| 2002/0148533 A1 | * | 10/2002 | Kim et al. | 148/24 |
| 2011/0114606 A1 | * | 5/2011 | Suzuki | 219/74 |

FOREIGN PATENT DOCUMENTS

| | | |
|---|---|---|
| FR | 2 786 719 | 6/2000 |
| JP | A 61-144274 | 7/1986 |
| JP | 64-48678 A | 2/1989 |
| JP | 2001-191197 A | 7/2001 |
| JP | 2001-219292 | 8/2001 |
| JP | 2002-205170 A | 7/2002 |

OTHER PUBLICATIONS

Japanese Office Action dated Apr. 17, 2012 in patent application No. 2010-090731 with English translation.
Notice of Reasons for Rejection dated Oct. 15, 2013 in Japanese Patent Application No. 2012-230761 w/English translation.

\* cited by examiner

FIG. 4

| | Shielding gas (% by volume) | | | 1 | 2 | 3 | 4 | 5 | 6 |
|---|---|---|---|---|---|---|---|---|---|
| | He | $CO_2$ | Ar | Arc stability | Oxidation degree | Slag generation amount | Wettability | Spatter generation amount | Penetration depth |
| Example 1 | 50 | 5 | 45 | G1 | G2 | G2 | G2 | G1 | G1 |
| Example 2 | 50 | 7 | 43 | G2 | G2 | G2 | G2 | G2 | G2 |
| Example 3 | 50 | 15 | 35 | G2 | G2 | G2 | G3 | G2 | G3 |
| Example 4 | 50 | 17 | 33 | G2 | G2 | G1 | G3 | G1 | G3 |
| Example 5 | 30 | 15 | 55 | G2 | G2 | G2 | G1 | G2 | G2 |
| Example 6 | 40 | 15 | 45 | G2 | G2 | G2 | G2 | G2 | G2 |
| Example 7 | 70 | 5 | 25 | G2 | G2 | G2 | G3 | G2 | G1 |
| Example 8 | 80 | 5 | 15 | G1 | G2 | G2 | G3 | G1 | G1 |
| Comparative Example 1 | — | 20 | 80 | G1 | G1 | G1 | G0 | G0 | G1 |
| Comparative Example 2 | 20 | — | 80 | G0 | G2 | G2 | G0 | G0 | G0 |
| Comparative Example 3 | 50 | — | 50 | G0 | G2 | G2 | G1 | G0 | G0 |
| Comparative Example 4 | 50 | 3 | 47 | G0 | G2 | G2 | G1 | G0 | G0 |
| Comparative Example 5 | 50 | 20 | 30 | G1 | G1 | G1 | G2 | G0 | G2 |
| Comparative Example 6 | 10 | 15 | 75 | G2 | G2 | G2 | G0 | G2 | G1 |
| Comparative Example 7 | 90 | 5 | 5 | G1 | G2 | G2 | G3 | G0 | G0 |

FIG. 7

|  | Shielded metal arc welding | Automatic TIG welding | Automatic MAG welding |
|---|---|---|---|
| Gap shape | General gap | Narrow gap | Narrow gap |
| Gap sectional area [mm$^2$] | 1500 | 500 | 500 |
| Deposited amount [g/min.] | 25 | 8 | 50 |
| Deposition efficiency [%] | 55 | 100 | 95 |
| Substantial deposited amount [g/min.] | 13.75 | 8 | 47.5 |
| Arc time ratio [%] | 40 | 80 | 60 |
| Specific gravity of weld metal | 7.85 | 7.85 | 7.85 |

FIG. 8

|  | Shielded metal arc welding | Automatic TIG welding | Automatic MAG welding |
|---|---|---|---|
| Required weld amount [mm$^3$] (Gap cross-sectional area [mm$^2$] × weld line length [mm]) | Approx. 1,200,000 | Approx. 400,000 | Approx. 400,000 |
| Required weld amount [g] (Required weld amount [mm$^3$] /specific gravity of weld metal) | Approx. 9,420 | Approx. 3,140 | Approx. 3,140 |
| Arc time [min.] (Required weld amount [g] /substantial deposited amount [g/min.]) | Approx. 685 | Approx. 393 | Approx. 66 |
| Welding time [Hr.] (Arc time [min.]/arc time ratio [%])/60 | Approx. 28.5 | Approx. 8.2 | Approx. 1.8 |

SHIELDING GAS FOR MAG WELDING, MAG WELDING METHOD, AND WELDED STRUCTURE

CROSS-REFERENCE TO RELATED APPLICATION

This application is based upon and claims the benefit of priority from Japanese Patent Application No. 2010-090731, filed on Apr. 9, 2010; the entire contents of which are incorporated herein by reference.

FIELD

Embodiments described herein relate generally to a shielding gas for MAG welding of a high Cr steel, a MAG welding method, and a welded structure

BACKGROUND

In recent years, power generating machines such as power generation turbines, boilers, etc. tend to be used under high temperature and high pressure to improve their thermal efficiency. Therefore, high Cr steels (e.g., 9Cr steel and 12Cr steel) having superior strength at high temperature have been developed as constituting materials of the power generating machines.

Welding is useful for manufacturing the power generating machines, and there have been developed high Cr steel welding technologies. For example, there is developed a technology to improve stability of arc at a time of welding by containing rare earth metals into a welding material for MAG welding of high Cr steels.

But, it is not necessarily easy to produce the above-described welding material when it contains a preferable rare earth metal content, and its cost becomes high in comparison with the general high Cr steel MAG welding material, and it is difficult to secure the narrow gap welding quality.

BRIEF DESCRIPTION OF THE DRAWINGS

FIG. 4 is a table showing the results of Example 1.
FIG. 7 is a table showing parameter values used for calculation of welding time durations.
FIG. 8 is a table showing the results of Example 2.

DETAILED DESCRIPTION

A shielding gas for MAG welding according to one embodiment is a shielding gas for MAG welding to perform narrow gap welding of a high Cr steel containing 8 wt % to 13 wt % of Cr with one layer-one pass by using a solid wire containing 8 wt % to 13 wt % of Cr, and comprises a ternary mixed gas of 5% by volume to 17% by volume of a carbon dioxide gas, 30% by volume to 80% by volume of a helium gas and a balance of an argon gas.

The embodiment is described below.

The present inventors have made a study on a shielding gas for MAG welding of a high Cr steel. As a result, it was found that a ternary shielding gas of He—Ar—$CO_2$ can be used to perform MAG welding having excellent arc stability, wettability of a weld metal and gap end penetration, even in a narrow gap.

The MAG welding is one type of arc welding. The arc welding generates an arc discharge between a base material and an electrode (welding wire) to connect the base material and the welding wire by melting them at the high temperature of arc. The MAG welding covers the arc generated from the electrode (welding wire) by a shielding gas mixture of an inert gas and a carbon dioxide gas. As a result, the arc is stabilized and mixing of the atmosphere into the melted metal is prevented.

The narrow gap welding means arc welding of a gap having a small angle which is formed by, for example, opposing or contacting the ends of thick plates with a small interval between them relative to the plate thickness. Here, it is particularly considered that multilayer welding of a narrow gap is performed in each layer with one pass per layer (with one layer-one pass).

It is to be noted that the one pass means one welding operation (one continuous welding from the start to end of a welding line) along the welding line (line used to indicate the bead formed by welding by assuming it as one line). In other words, the one layer-one pass welding means formation of one bead layer by a single welding operation along the welding line. Multilayer welding (multilayer build-up welding) is welding to stack plural layers of weld beads. In other words, the multilayer welding repeats a process of melting the solid wire by arc discharge and forming one bead layer in the narrow gap to form the plural layers of beads in the narrow gap.

Figure 1:
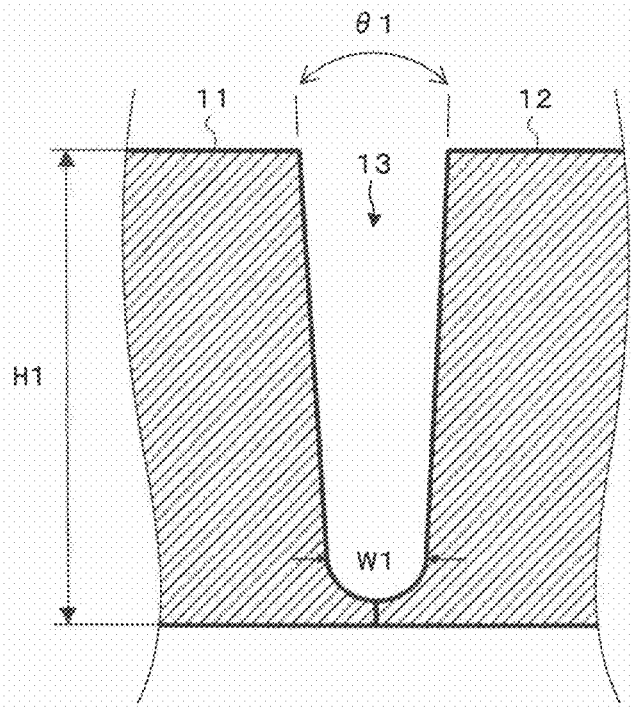
FIG. 1 is a sectional view showing an example of a narrow gap shape.

FIG. 1 is a sectional view showing an example of the narrow gap shape. End faces of base materials 11 and 12 such as thick plates are arranged to contact their bottom ends with a gap 13 between them. An interval W1 (e.g., 20 mm or less) between the base materials 11 and 12 is small at the bottom of the gap 13 relative to a thickness H1 (e.g., 50 mm) of the base materials 11 and 12 (W1<H1).

And, an angle θ1 formed by wall surfaces (end faces of the base materials 11 and 12) of the gap 13 is determined to be small, e.g., 10° or less.

Figure 2:
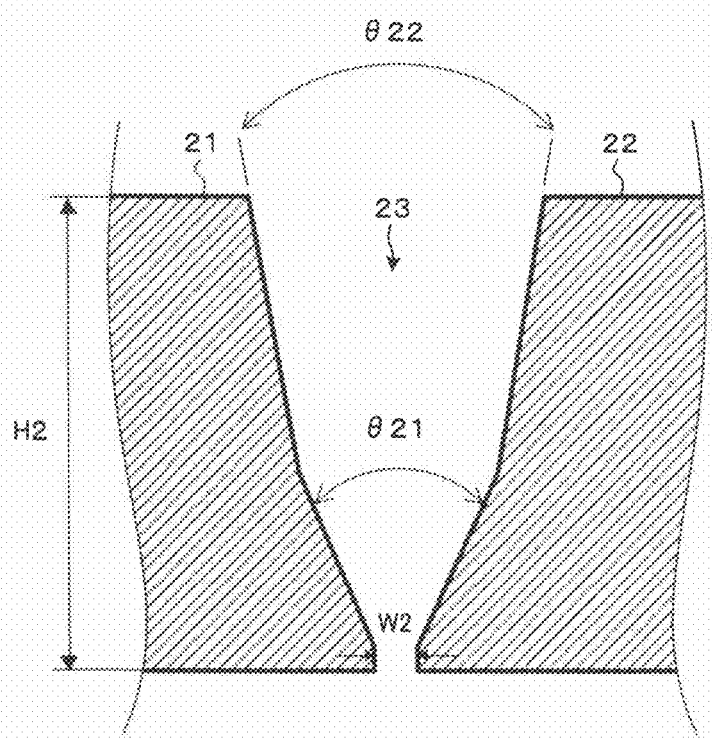
FIG. 2 is a sectional view showing an example of a general gap shape.

FIG. 2 is a sectional view showing an example of a general gap shape. End faces of base materials 21 and 22 such as thick plates are arranged to face each other with a gap 23 between them. In this example, the angle formed between the wall surfaces (end faces of the base materials 21 and 22) of the gap 23 changes in two stages θ21 and θ22.

Here, when a ratio (W1/H1) between the thickness H1 and the interval W1 of the base materials 11 and 12 is 0.4 or less and the angle θ1 is 10° or less in FIG. 1, the gap is called a narrow gap.

In addition, the thickness H1 and the interval W1 may also satisfy the following conditions. When H1≤200 mm, W1≤20 mm, and when H1>200 mm, W1≤30 mm.

As shown in FIG. 2, when the angle θ1 is not constant (e.g., when it changes at plural stages), a substantially maximum angle is determined as the angle θ1. The bottom ends of the base materials 11 and 12 are mutually contacted in FIG. 1, but even if the bottom ends of the base materials 11 and 12 are not mutually contacted, the gap may also be called a narrow gap.

Figure 3:
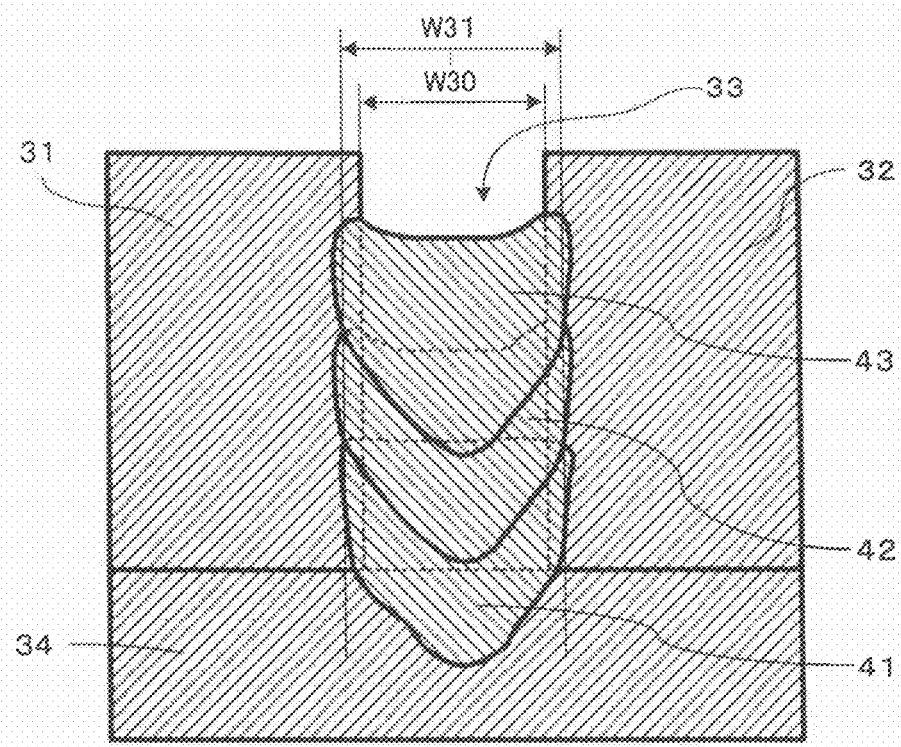
FIG. 3 is a sectional view showing a welded state of a narrow gap.

FIG. 3 is a sectional view showing a welded state of the narrow gap. End faces of base materials 31 and 32 such as thick plates are arranged to have a gap 33 between them. A backing plate 34 is arranged at the bottoms of the base materials 31 and 32. Weld beads 41 to 43 are arranged in the gap 33. The weld beads 41 to 43 are arranged such that one bead is in one layer (in the vertical direction in the drawing sheet), so that this welding is three-layer welding in each layer with one layer-one pass.

It is considered that when the beads 41 to 43 have a width W31 large enough relative to an interval W30 between the base materials 31 and 32, welding between the base materials 31 and 32 has a sufficient penetration depth. In FIG. 3, the direction of the welding line is perpendicular to the drawing sheet, and the direction of the gap is directed upward in the drawing sheet.

The high Cr steel is an alloy material containing iron as the main component and Cr in a relatively high concentration (8 to 13% by mass). Cr is an element significant for improvement of the corrosion resistance, oxidation resistance and creep strength of the metallic material. When Cr is less than 8 wt %, its effect to provide the corrosion resistance and the like is less. And, when Cr is 13 wt % or more, δ ferrite is crystallized, and strength and brittleness decrease. Therefore, the high Cr steel used under high temperature and high pressure for power generating machines (power generation boiler and turbine parts) and the like contains generally 8 to 13 wt % of Cr.

The high Cr steel contains more preferably a Cr content of 8.5 to 11 wt %. The shielding gas for MAG welding according to the embodiment described later can be preferably applied to MAG welding of the high Cr steel containing 8.5 to 11 wt % of Cr.

For high Cr steel welding, a wire (welding wire) containing 8 to 13 wt % (or 8.5 to 11 wt %) of Cr, which is similar composition metal (same type of metal), is used (similar composition metal welding).

But, it is not necessarily easy to perform welding of the high Cr steel in comparison with the low carbon steel and the like, and narrow gap welding (especially, multilayer (build-up) welding in a narrow gap) is difficult. The narrow gap welding of the high Cr steel by using a general shielding gas (mixed gas having 20% by volume of carbon dioxide gas contained in argon gas) for MAG welding is considered. In this case, slag of the high Cr steel is so hard that the removal of the slag from the gap end is difficult, and the slag does not float at the time of the next pass welding, and slag inclusion is apt to generate at the gap end. And, since the wettability of the bead is poor, the bead is apt to have a convex shape, and a weld defect such as a fusion defect or the like is easily generated.

The shielding gas for MAG welding according to the embodiment comprises a ternary mixed gas of 5% by volume to 17% by volume of a carbon dioxide gas, 30% by volume to 80% by volume of a helium gas and a balance of an argon gas.

Reasons of restricting the components of the shielding gas for MAG welding are described below.

For the arc stability of MAG welding, it is important that an oxidizing gas such as oxygen or a carbon dioxide gas is contained in the shielding gas. To stabilize the arc in the MAG welding, it is important that a cathode spot of the arc is formed stably, and the cathode spot is generated more readily when there is an oxide on the cathode side. When the shielding gas is composed of only an inert gas such as an argon gas or a helium gas, the atmosphere on the cathode side does not contain an oxidizing gas, so that the generation of an oxide is poor on and near the weld pool surface, and it is hard to stabilize the cathode spot. As a result, the arc behavior becomes unstable, causing an excessive spread of the arc, unstable arc or the like. Especially, the arc spreads excessively in the narrow gap or the arc climbs up the gap walls, and the arc is apt to become unstable. When the arc becomes unstable, there occurs a weld defect or trouble such as a fusion defect of the gap end, a bead shape defect, spatter generation or the like.

When the shielding gas contains a carbon dioxide gas, an oxide which becomes a cause of the cathode spot is generated by the oxidizing power of the carbon dioxide gas, and the cathode spot is stabilized. By containing the carbon dioxide gas, the arc itself is constricted by a thermal pinch effect, and an arc rigidity and directionality are also improved. Therefore, when the shielding gas contains a carbon dioxide gas, the arc stability is improved, the spatter generation is reduced, and the gap end can be melted effectively.

It is not preferable if the carbon dioxide gas concentration is less than 5% by volume because the arc stability is not sufficient and if it exceeds 17% by volume because the spattering increases. In other words, if the carbon dioxide gas content is excessively large, the arc is constricted excessively, the separation of a droplet from the welding wire is disturbed, the arc becomes unstable, and the spattering increases. The shielding gas according to the embodiment has a carbon dioxide gas content smaller than the general shielding gas (mixed gas having 20% by volume of a carbon dioxide gas contained in an argon gas) for MAG welding. Therefore, the oxidizing power of the shielding gas becomes somewhat weak, and the oxidation of the bead and the generation of slag on the bead surface decrease.

When oxygen is used as the oxidizing gas, its oxidizing power is excessive, and the weld appearance and penetration into the base material are not necessarily good. Therefore, oxygen is not used as the oxidizing gas of the shielding gas for MAG welding according to the embodiment.

The helium gas has a large potential gradient in comparison with the argon gas, so that the arc voltage at the time of welding becomes high, and the heat generation due to the arc increases. As a result, heat input into the base material increases, melting of the base material is promoted, the base material melting amount increases, and the penetration becomes deep. In case of the narrow gap, the gap end can also be melted sufficiently, so that a sufficient penetration is obtained, and a fusion defect decreases. When the melting amount of the base material increases, the generation of metal vapor, which is effective for improvement of arc stability, from the weld pool is also promoted, so that the arc stability is also improved to some extent. Since the heat generation due to the arc increases, the base material is also heated by heat conduction, and lowering of the arc force on the weld pool surface at the time of arcing due to a low helium gas density also acts to improve the wettability of a weld metal (bead).

When the helium gas concentration is less than 30% by volume, the increase of penetration and the improvement of wettability are not sufficient. Meanwhile, when the helium gas concentration exceeds 80% by volume, it becomes difficult to generate the arc at the start of welding (deterioration of arc starting property) and the helium gas density is low, so that shielding property against the atmosphere deteriorates (mixing of the atmosphere into the melted metal becomes easy).

As described above, as the shielding gas for narrow gap welding of a high Cr steel, the ternary mixed gas of 5% by volume to 17% by volume of a carbon dioxide gas, 30% by volume to 80% by volume of a helium gas and a balance of an argon gas is used suitably.

The ternary mixed gas can be used to perform welding of a narrow gap of high Cr steel with MAG welding.

It is preferable to perform the pulse MAG welding under the welding conditions including a peak current of 350 to 500 A, a base current of 40 to 100 A and a pulse frequency of 100 to 400 Hz. Spatter and fume can be reduced by using the pulse MAG welding.

The peak current contributes to securing of an electromagnetic pinching force and the separation of a droplet from the welding wire. When the peak current is less than 350 A, the droplet is hardly separated from the welding wire until the droplet becomes large because the electromagnetic pinching force is weak. As a result, spatter and fume might generate in a large amount by deviating from one pulse-one droplet transfer. And, when the peak current exceeds 500 A, the arc force, which pushes up the droplet, becomes so strong that the regular separation of the droplet from the welding wire becomes difficult, resulting in one pulse-plural droplet transfer.

The base current contributes to the stable droplet shaping by continuing the arc. When the base current is less than 40 A, there is a tendency that the arc goes off or a short circuit occurs. When the base current exceeds 100 A, the arc force contributing to the droplet transfer becomes large, the droplet sways, and the stable droplet shaping becomes difficult.

The pulse frequency influences a size of the droplet per pulse and a synchronization ratio between the pulse and the droplet transfer. When the pulse frequency is less than 100 Hz, the droplet per pulse becomes excessively large, and a short circuit tends to occur between the droplet and the weld pool. And, when the pulse frequency exceeds 400 Hz, the droplet transfer deviates from the one pulse-one droplet transfer and does not synchronize with the pulse.

The pulse welding conditions have an effect on the droplet transfer style and, therefore, on the generation of spatter and fume and the generation of weld defects. In other words, when the average current is excessively small, penetration in the gap end becomes poor by the narrow gap welding, and a fusion defect or the like occurs. When the average current is excessively large, the cooling speed of the weld pool becomes slow, and a hot crack occurs.

As described above, as the pulse MAG welding conditions for the high Cr steel, the peak current of 350 to 500 A, the base current of 40 to 100 A and the pulse frequency of 100 to 400 Hz are suitable.

By using the ternary mixed gas, it becomes easy to make the welding attitude to the all position in the MAG welding of a high Cr steel. The all position is a collective term for a downward flat position, a lateral position, a standing vertical position and an upward position.

Generally, the weld pool is sagged by gravity, wettability degrades, and the bead tends to have a convex shape in the lateral position, the standing vertical position and the upward position, and particularly in the upward position. When the multilayer build-up welding is used to weld on the convex-shape bead, a weld defect such as a fusion defect or the like is caused. Therefore, when the ternary mixed gas is used, welding can be performed even by the all position welding without deteriorating the wettability of a weld metal.

The downward position means that the welding line direction is substantially horizontal, and the gap direction is upward (worker's direction is downward). The upward position means that the welding line direction is substantially horizontal, and the gap direction is downward (worker's direction is upward). The lateral position means that the welding line direction is substantially horizontal and the gap direction is substantially horizontal (worker's direction is transverse). And the standing vertical position means that the welding line direction is substantially vertical.

As described above, when the narrow gap welding of the high Cr steel containing 8 to 13 wt % of Cr is performed with one layer-one pass by using the solid wire containing 8 to 13 wt % of Cr, it is desirable to use as the shielding gas a ternary mixed gas of 5 to 17% by volume of a carbon dioxide gas, 30% by volume to 80% by volume of a helium gas and a balance of an argon gas. Even in a narrow gap, it becomes possible to perform welding having excellent arc stability, wettability of a weld metal and penetration in the gap end.

The shielding gas suitable for the MAG welding of high Cr steel according to the embodiment is described below referring to examples.

Example 1

To confirm the characteristics and effects of the shielding gas according to the embodiment, verification tests were performed on various characteristics.

MAG welding was performed in a narrow gap by using 9Cr steel plates. A ternary mixed gas of He gas, $CO_2$ gas and Ar gas was used as the shielding gas with its components (% by volume) varied. Evaluation was made on arc stability, an oxidation degree, a slag generation amount, wettability, a spatter generation amount and a penetration depth.

Welding conditions in the tests are as follows.
<Welding Conditions>
Welding method: narrow gap MAG welding in one pass/ layer
Welding base material: equivalent to A182 F91 (ASTM)
Welding wire: equivalent to AWS A5.28 ER90S-B9, diameter 1.2 mm
Peak current: 400 to 500 A
Base current: 50 to 70 A
Pulse frequency: 100 to 200 Hz
Welding voltage: 28 to 32V To clarify the characteristics obtained by the MAG welding using the shielding gas according to the embodiment, the welding was performed as comparative examples by using a mixed gas, which had 20% by volume of $CO_2$ gas contained in an Ar gas conventionally used as the shielding gas for the MAG welding, and a binary mixed gas of Ar—He.

Individual test items were evaluated and classified into four levels: excellent ("G3"), good ("G2"), not bad ("G1") and bad ("G0").

(1) Arc Stability

Arc was visually observed while welding, and its stability was judged according to the temporal variation of the arc.

(2) Oxidation Degree

Bead appearance after welding was visually observed, and the oxidation degree was judged according to a degree of discoloration of bead.

(3) Slag Generation Amount

Bead appearance after welding was visually observed, and the slag generation amount was judged according to an area of the slag occupying the bead.

(4) Wettability

Bead appearance after welding was visually observed, and wettability was judged according to a bead shape in the gap. When the bead has a concave shape, wettability of the bead in the gap is good, and when the bead has a convex shape (convex bead), wettability of the bead in the gap is not good.

(5) Sutter Generation Amount

Bead appearance after welding was visually observed, and the spatter generation amount was judged according to an area of the spatter occupying the bead.

(6) Penetration Depth

Penetration depth was evaluated in four levels based on a ratio (W31/W30) of a width W31 of beads 41 to 43 to an interval W30 between base materials 31 and 32 in FIG. 3. The width W31 was determined to be a width in the horizontal direction of the boundary between the beads 41 and 42.

The evaluated results are shown in FIG. 4.

The ternary shielding gas of He—Ar—$CO_2$ according to the embodiment had arc stability improved more by virtue of the addition of a carbon dioxide gas in comparison with the binary shielding gas of Ar—He. The binary shielding gas of Ar—He does not contain an oxidizing gas, so that its oxidation degree and the slag generation amount are good, but the cathode spot becomes unstable, the arc is not stabilized, and the spatter is considerably large in quantity.

When the carbon dioxide gas was about 3% by volume, arc stability was insufficient, but when the carbon dioxide gas was 5% by volume or more, arc stability was good. The ternary shielding gas of He—Ar—$CO_2$ according to the embodiment had a carbon dioxide gas content of 15% by volume or less and a carbon dioxide content which was small in comparison with the shielding gas having 80% by volume Ar and 20% by volume $CO_2$. When the ternary shielding gas according to the embodiment was used, the oxidation degree, the slag generation amount and the spatter generation amount became low. When the spatter generation amount is large, it is not desirable in manufacturing because not only the quality is bad but also a contact tip, a shielding gas nozzle and the like are heavily worn to result in an increase of their exchange frequency.

In addition, since He is an inert gas, its influence on mechanical properties of a weld metal is small, and the tensile strength of the weld metal is same to that of one welded using a gas of 80% by volume Ar and 20% by volume $CO_2$. And it can be said that toughness is generally improved more when the ternary shielding gas of He—Ar—$CO_2$ according to the embodiment is used because the amount of oxygen in the weld metal is smaller.

Figure 5:
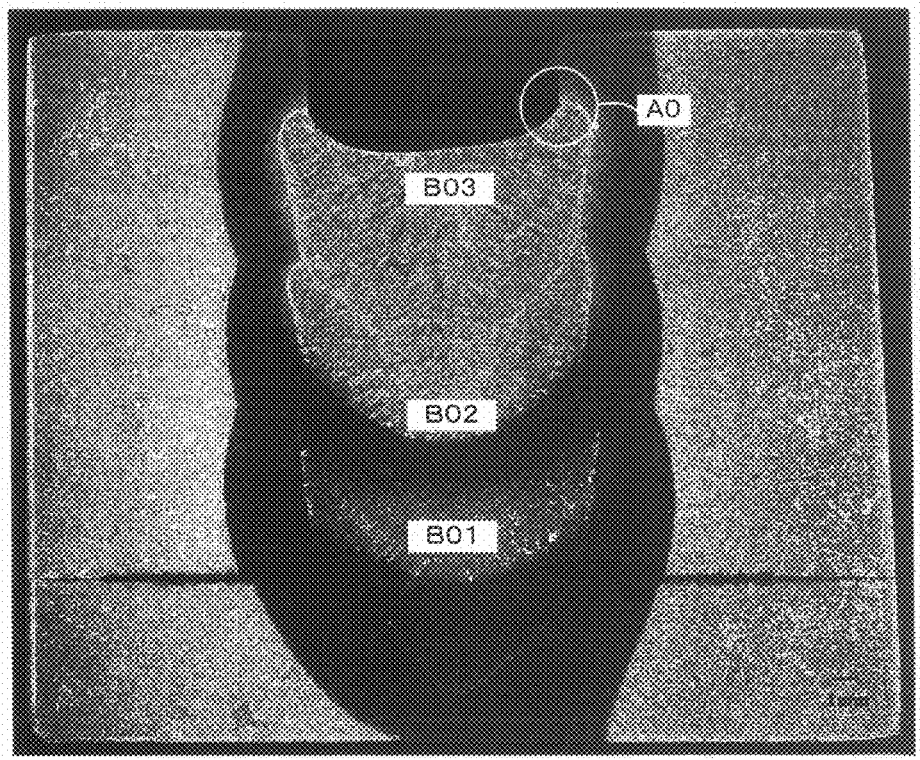
FIG. 5 is a photograph showing across section of a test specimen of Example 3 (welding by using a ternary shielding gas of He—Ar—$CO_2$).
Figure 6:
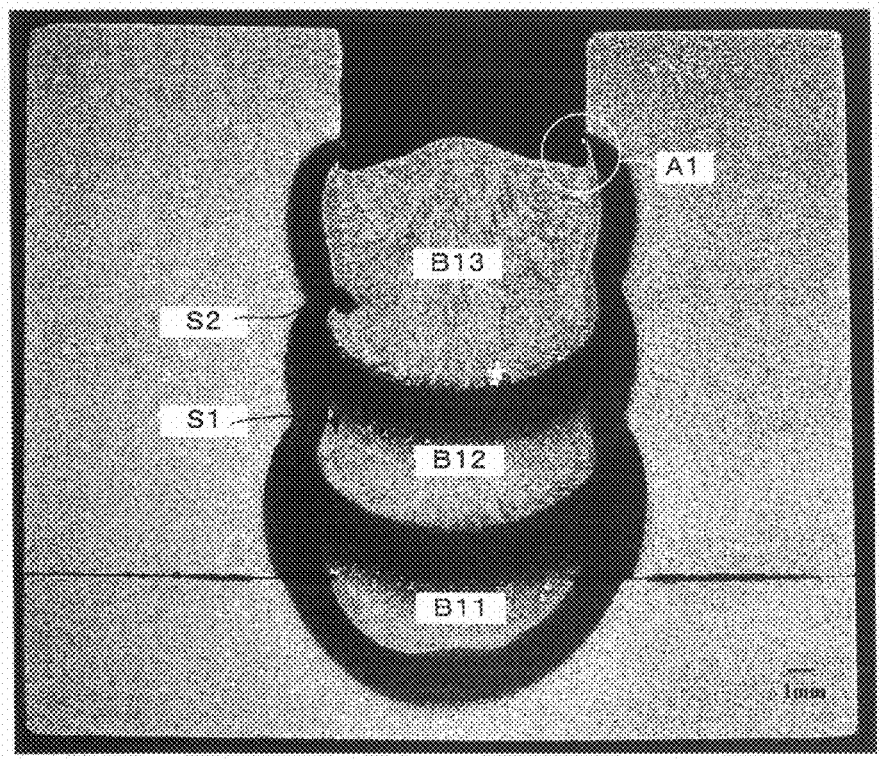
FIG. 6 is a photograph showing across section of a test specimen of Comparative Example 1 (welding by using a binary shielding gas of Ar—$CO_2$).

FIG. 5 and FIG. 6 are photographs showing cross sections of the test specimens welded by Example 3 (ternary shielding gas of He—Ar—$CO_2$) and Comparative Example 1 (binary shielding gas of Ar—$CO_2$). Three-layer beads B01 to B03 and B11 to B13 are formed with one layer-one pass in Example 3 and Comparative Example 1.

As shown in FIG. 5, wettability is good (bead B03 has a concave shape at its top), slag inclusion is not observed, and a penetration depth is good in Example 3. It is seen from FIG. 6 that wettability is poor (bead B13 has a convex shape at its top), weld defects S1 and S2 occur at the gap end due to the slag inclusion, and penetration in the gap is not good either in Comparative Example 1. As shown in FIG. 6, when the bead has a convex shape (wettability is not good), a concave is formed in an outer peripheral part A1 of the bead, resulting in a cause of weld defects such as slag inclusion and the like. On the other hand, when the bead has a concave shape (wettability is good) as shown in FIG. 5, a concave is not easily formed in an outer peripheral part A0 of the bead, and a weld defect such as slag inclusion or the like is not caused easily.

Example 2

Described below is an example of welding work on a structure represented by power generation boilers and turbines using the ternary shielding gas of He—Ar—$CO_2$ according to the embodiment.

In recent years, to improve thermal efficiency, power generating machines such as power generation turbines, boilers, etc. are apt to be used under high temperature and high pressure. Therefore, for constituting material of the power generating machine, a high Cr steel (e.g., 9Cr steel or 12Cr steel) having superior strength at high temperatures has been developed. Typical examples of the component members of the power generating machine include turbine pipes, which are passages of high-temperature and high-pressure steam produced in the boiler, valves, turbine nozzles, etc.

Conventionally, the above high Cr steel welded structures are often welded by shielded metal arc welding or TIG welding that has good welding workability and quality when they are manufactured in a factory and also when they are installed on site. But the above welding methods are inferior in welding efficiency in comparison with the MAG welding. Accordingly, use of the ternary shielding gas of He—Ar—$CO_2$ according to the embodiment makes it possible to weld the above high Cr steel structures by the MAG welding having good welding workability and quality, and the manufacturing cost can be reduced. And, the manufacturing cost can be further reduced by designing the gap as a narrow gap.

For quantitative evaluation of the manufacturing cost reduction, all position welding of a turbine pipe is described as an example. As the welding processes, shielded metal arc welding, automatic TIG welding, and automatic MAG welding which uses the ternary shielding gas of He—Ar—$CO_2$ according to the embodiment were selected. And the results obtained by the above three processes were compared. The turbine pipe size was determined to have 500 A and thickness 50 t which are used for a main steam lead pipe and the like. FIG. 7 shows parameter values used to calculate welding time durations.

The narrow gap and the general gap in the example were determined to have angles θ1=1 to 6°, θ21=60 to 90° and θ22=10 to 30°, intervals W1=4 to 12 mm and W2=2 to 6 mm, and thickness H1=H2=50 mm in FIG. 1 and FIG. 2. The narrow gap (FIG. 1) and the general gap (FIG. 2) have gap cross-sectional areas of about 500 $mm^2$ and about 1500 $mm^2$.

For the TIG welding, the narrow gap being used extensively to perform all position automatic TIG piping welding was selected. And, for the MAG welding, the same narrow gap as used for the TIG welding was selected (conventionally, all position automatic welding of high Cr steel with a narrow gap had poor wettability and gap end penetration, and it was hard to perform, but the narrow gap welding becomes possible to perform by using the ternary shielding gas of He—Ar—$CO_2$ according to the embodiment). In the shielded metal arc welding, a gap cross-sectional area was determined to be three times larger than the narrow gap cross-sectional area. And, a deposited amount, a deposition efficiency and an arc time ratio were selected to have a general value used in each welding process of the present welding work.

FIG. 8 shows the welding time durations calculated according to the parameters of FIG. 7. The welding line length used to calculate the required weld amount in mm 3 was determined to be about 800 mm.

As shown in FIG. 8, application of the automatic MAG welding using the ternary shielding gas of He—Ar—$CO_2$ according to the embodiment enables to perform welding work in about ⅓₁₃ of the shielded metal arc welding time duration and in about ¼ of the TIG welding time duration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MAG welding method, comprising:
   preparing a pair of base materials which are made of a high Cr steel containing 8 wt % to 13 wt % of Cr and arranged to have a narrow gap between them; and
   performing arc welding of the pair of base materials by using a shielding gas being a ternary mixed gas consisting essentially of 15% by volume to 17% by volume of a carbon dioxide gas, 30% by volume to 50% by volume of a helium gas and a balance of an argon gas, and a solid wire containing 8 wt % to 13 wt % of Cr.

2. The MAG welding method according to claim 1,
   wherein the arc welding step includes a step of forming plural bead layers in the narrow gap by repeating a step of forming a single bead layer in the narrow gap by melting the solid wire by arc discharge.

3. The MAG welding method according to claim 2,
   wherein the single bead layer is formed by performing only one scanning along a welding line in the bead layer forming step.

4. The MAG welding method according to claim 1,
   wherein the arc welding step includes a step of pulse MAG welding the pair of base materials by arc discharge at a peak current of 350 A to 500 A, a base current of 40 A to 100 A and a pulse frequency of 100 Hz to 400 Hz.

5. The MAG welding method according to claim 1,
   wherein a welding attitude in the arc welding step is all positions.

6. The MAG welding method according to claim 5,
   wherein the welding attitude is one of a lateral position, a standing vertical position and an upward position.

7. The MAG welding method according to claim 1,
   wherein the angle formed between the pair of base materials in the narrow gap is 10° or less.

8. A welded structure manufactured by using the MAG welding method according to claim 1.

9. The MAG welding method according to claim 1,
   wherein the base materials have the narrow gap therebetween, an angle between the pair of base materials is 10° or less, and a ratio of thicknesses of the base materials to the interval of the base materials is 0.4 or less.

* * * * *